(12) United States Patent
Langer et al.

(10) Patent No.: US 11,888,721 B2
(45) Date of Patent: Jan. 30, 2024

(54) NETWORK MONITORING

(71) Applicant: Telefonaktiebolaget LM Ericsson (publ), Stockholm (SE)

(72) Inventors: Alexander Langer, Herzogenrath (DE); Joerg Christian Ewert, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/925,992

(22) PCT Filed: May 18, 2020

(86) PCT No.: PCT/EP2020/063862
§ 371 (c)(1),
(2) Date: Nov. 17, 2022

(87) PCT Pub. No.: WO2021/233524
PCT Pub. Date: Nov. 25, 2021

(65) Prior Publication Data
US 2023/0208740 A1 Jun. 29, 2023

(51) Int. Cl.
*H04L 12/00* (2006.01)
*H04L 43/12* (2022.01)
*H04L 41/28* (2022.01)

(52) U.S. Cl.
CPC ............. *H04L 43/12* (2013.01); *H04L 41/28* (2013.01)

(58) Field of Classification Search
CPC ..... H04L 43/12; H04L 41/28; H04L 65/1059; H04L 63/1416
(Continued)

(56) References Cited

U.S. PATENT DOCUMENTS

2017/0085459 A1* 3/2017 Xia ................... H04L 43/12
2017/0137047 A1* 5/2017 Kim ................... B61L 15/0027
(Continued)

FOREIGN PATENT DOCUMENTS

WO 2019200303 A1 10/2019

OTHER PUBLICATIONS

International Search Report and Written Opinion dated Jan. 22, 2021 for International Application No. PCT/EP2020/063862 filed May 18, 2020, consisting of 12-pages.
(Continued)

*Primary Examiner* — Frantz Coby
(74) *Attorney, Agent, or Firm* — Christopher & Weisberg, P.A.

(57) ABSTRACT

In one aspect, a method performed by a first node in a first communications network is provided. The method includes receiving first trace data for the first communications network, in which the first trace data comprises one or more first attributes. The method further includes replacing the one or more first attributes in the first trace data with corresponding second attributes to provide second trace data, sending the second trace data to a second node for performing network monitoring and receiving, from the second node, first network monitoring information for the first communications network based on the second trace data, in which the first network monitoring information comprises the one or more second attributes. The method further includes replacing at least one of the second attributes in the first network monitoring information with corresponding third attributes, based on the first attributes, to provide second network monitoring information.

20 Claims, 4 Drawing Sheets

(58) Field of Classification Search
USPC .................................................. 709/224–226
See application file for complete search history.

(56) References Cited

U.S. PATENT DOCUMENTS

| | | | |
|---|---|---|---|
| 2018/0212989 A1* | 7/2018 | Mavani | ............... H04L 63/1416 |
| 2019/0173893 A1* | 6/2019 | Muddu | .................. G06N 5/022 |
| 2021/0186329 A1* | 6/2021 | Tran | ......................... A43B 3/42 |

OTHER PUBLICATIONS

Xia, Ming M.; NFV Network Monitoring framework Diamond; Ericsson Research Blog; Aug. 26, 2015, consisting of 7-pages.
Meng, Shicong et al.; Enhanced Monitoring-as-a-Service for Effective Cloud Management; IEEE Transactions on Computers, vol. 62, No. 9; Sep. 2013, consisting of 16-pages.

* cited by examiner

NETWORK MONITORING

CROSS-REFERENCE TO RELATED APPLICATIONS

This application is a Submission Under 35 U.S.C. § 371 for U.S. National Stage Patent Application of International Application Number: PCT/EP2020/063862, filed May 18, 2020 entitled "NETWORK MONITORING," the entirety of which is incorporated herein by reference.

TECHNICAL FIELD

Examples of the present disclosure relate to network monitoring in communications networks.

BACKGROUND

In some communications networks, some services may be provided in the form of software containers and microservices. In such cases, functionality is abstracted into small software components, referred to as containers, which may act autonomously and can be started and stopped as needed. Networks may have large numbers of containers running at any one time, which can make it difficult to identify and trace problems (e.g. bottlenecks) in the network.

In Release 15 of the Third Generation Partnership Project (3GPP), these technologies may be implemented in core networks of communications networks as part of a service-based architecture. In this architecture, a network function may be implemented using one or more software containers or microservices running in one or more in containers. The HyperText Transfer Protocol 2 (HTTP2) and Representational State Transfer (REST) transport protocols may be used for communications between network functions.

Networks that make use of software containers and microservices can comprise large numbers of containers, which can make it difficult to monitor network performance and identify problems. A number of application performance monitoring (APM) tools have been developed to address this using big data solutions to enable monitoring and tracing. Many of these tools run as-a-service (aaS) in a network (e.g. a datacentre) of the APM provider, rather than within the network itself, which may require the network to share their network information with the APM provider over a public network. This can be particularly problematic for communications networks, such as mobile or cellular networks, in which messages sent between network functions may comprise private or sensitive information. For example, messages in the communications network may comprise user information, such as location information or subscriber number. The storage and distribution of such data may be regulated (e.g. according to the General Data Protection Regulation, GDPR), which may prohibit or restrict the sharing of network information with APM providers.

SUMMARY

One aspect of the present disclosure provides a method performed by a first node in a first communications network. The method comprises receiving first trace data for the first communications network, in which the first trace data comprises one or more first attributes. The method further comprises replacing the one or more first attributes in the first trace data with corresponding second attributes to provide second trace data and sending the second trace data to a second node for performing network monitoring. The method further comprises receiving, from the second node, first network monitoring information for the first communications network based on the second trace data, in which the first network monitoring information comprising the one or more second attributes. The method further comprises replacing at least one of the second attributes in the first network monitoring information with corresponding third attributes to provide second network monitoring information, wherein the third attributes are based on the first attributes.

In a further aspect, the present disclosure provides a first node configured to perform the abovementioned method.

The present disclosure also provides a computer program comprising instructions which, when executed on at least one processor, cause the at least one processor to carry out the aforementioned method. In a further aspect, the present disclosure provides a carrier containing the aforementioned computer program, wherein the carrier comprises one of an electronic signal, optical signal, radio signal or computer readable storage medium. In another further aspect, the present disclosure provides a computer program product comprising non-transitory computer readable media having stored thereon the aforementioned computer program.

A still further aspect of the present disclosure provides a first node in a first communications network. The first node comprises a processor and a memory, in which the memory contains instructions executable by the processor such that the first node is operable to receive first trace data for the first communications network, in which the first trace data comprises one or more first attributes. The memory contains instructions executable by the processor such that the first node is further operable to: replace the one or more first attributes in the first trace data with corresponding second attributes to provide second trace data, send the second trace data to a second node for performing network monitoring and receive, from the second node, first network monitoring information for the first communications network based on the second trace data. The first network monitoring information comprises the one or more second attributes. The memory contains instructions executable by the processor such that the first node is further operable to replace at least one of the second attributes in the first network monitoring information with corresponding third attributes to provide second network monitoring information, in which the third attributes are based on the first attributes.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC(s)) and/or field programmable gate array(s) (FPGA(s)), and (where appropriate) state machines capable of performing such functions.

Figure 1:
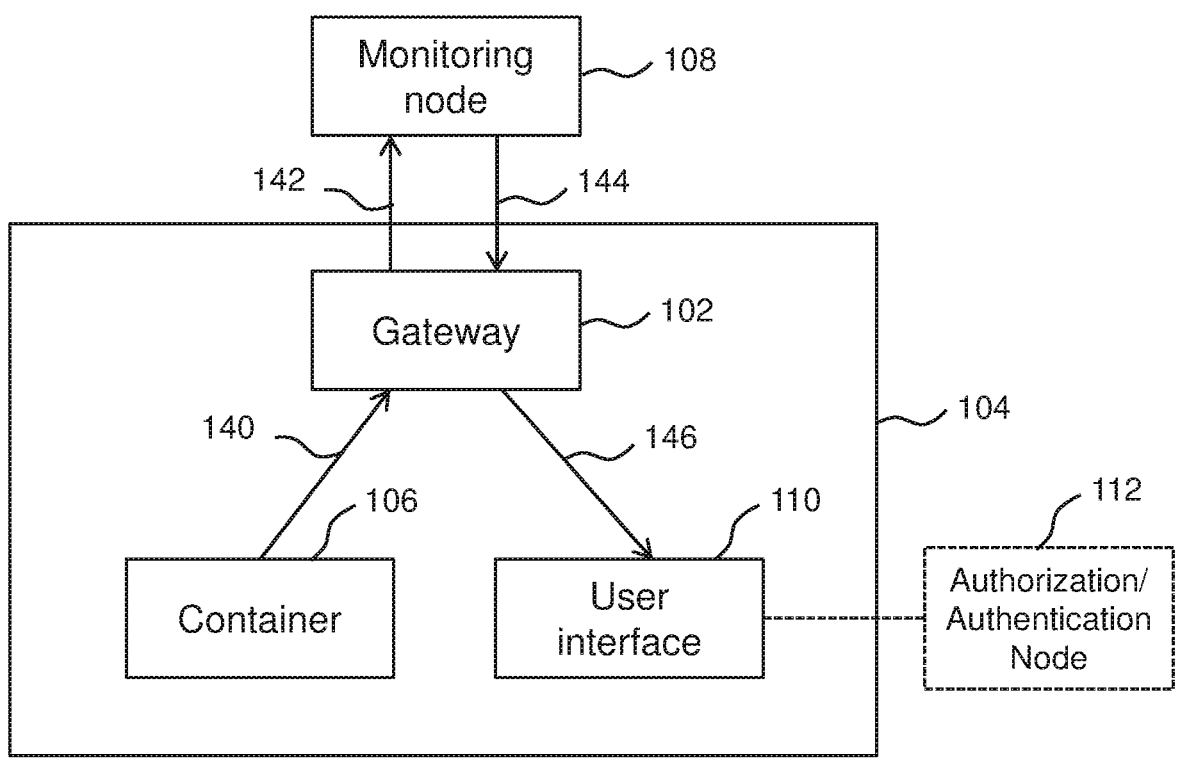
FIG. 1 illustrates a system according to an example of the disclosure.

FIG. 1 shows a system 100 according to aspects of the present disclosure. The system comprises a first communications network 104. The first communications network 104 may be, for example, a core network. The core network may be a Fifth Generation (5G) Core Network (SGCN). The core network may form part of a wider communications network implementing any suitable communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the core network is in a cellular telecommunications network, such as the type developed by the 3 rd Generation Partnership Project (3GPP). Those skilled in the art will appreciate that the system 100 may comprise further components that are omitted from FIG. 1 for the purposes of clarity.

The first communications network 104 comprises a container 106 (e.g. a software container). The container 106 may comprise one or more software components or microservices for providing one or more services in the first communications network 104. Alternatively, the container 106 may form part of a microservice (e.g. a microservice composed of a plurality of containers including the container 106). The container may, for example, be executing on one or more nodes in the network.

The container 106 may be a network function, or may provide the services of a network function. In examples in which the first communications network 104 is a core network, the container 106 may thus be or provide a core network function (or part of a core network function) such as, for example, an Access and Mobility Management Function (AMF), Authentication Server Function (AUSF), Unified Data Management (UDM), Policy Control Function (PCF) or any other suitable core network function.

Although only one container 106 is shown, the skilled person will appreciate that the network may comprise many more containers 106 than shown and may, in general, comprise one or more containers 106.

As noted above, the deployment of containers and microservices in communications networks can make it difficult to identify bottlenecks and other performance issues in a network. Although various application performance monitoring (APM) tools are available, these are often provided via public networks, which may necessitate sharing information outside of the communications network. As the storage and distribution of information may be regulated under various national and legal frameworks, the sharing of network information with APM tools can be severely restricted or even prohibited. In addition, it is often not possible to deploy APM tools locally within a communications network, as APM tools may be complex and difficult to redesign for execution in a different environment.

Aspects of the disclosure may address one or more of these and/or other problems. In one aspect, a first node in a first communications network is provided. The first node replaces one or more first attributes in first trace data received from a second node in the first communications network to obtain second trace data. The first network node sends the second trace data to a network monitoring mode and receives first network monitoring information from the network monitoring mode. The first network node replaces one or more second attributes in the first network monitoring information to obtain second network monitoring information. The one or more second attributes are replaced with third attributes that are based on the corresponding first attributes.

Thus, in the system 100 described above in respect of FIG. 1, the first communications network 104 is further provided with a gateway 102. The gateway 102 may provide an interface between the first communications network 104 and a monitoring node 108.

According to aspects of the disclosure, the gateway 102 receives first trace data 140 for the first communications network 104 from the container 106. The first trace data 140 may comprise information indicative of network activity such as, for example, data relating to messages sent or received by containers in the network 104.

The gateway 102 determines one or more first attributes in the trace data 140 to replace. For example, the first trace data 140 may comprise one or more first attributes that are considered to be private or sensitive. Examples of data that may be considered to be private includes information which indicates a subscriber identity (e.g. a subscribers' telephone number), information indicating a subscriber location (e.g. coordinate information or cell identifiers) and authentication information (e.g. keys, authentication results).

The gateway 102 replaces the one or more first attributes with one or more second attributes to provide second trace data 142, thereby pseudonymising the one or more first attributes.

The second attributes may be less specific or identifying than the first attributes, so that the second attributes may be shared with nodes or networks that may not be permitted to access the first attributes. Thus, the second attributes may consist of information that is considered to be less sensitive than the corresponding first attributes.

For example, the gateway 102 may replace location information that identifies a position of a user to within 10 metres with location information identifying the user's closest town or city, thereby making the location information less identifying. In another example, a subscriber number may be replaced by an alternative unique identifier or artificial identifier (e.g. a randomly generated identifier). Replacing the subscriber number with an alternative identifier may allow network information relating to a particular user to be identified in the network, whilst obscuring the identity of the user.

The gateway 102 may determine the second attributes corresponding to the one or more first attributes according to pre-defined rules. Alternatively, the gateway 102 may use an existing database or look-up table to determine the second attributes for the second trace data 142. In either case, the first attributes and the corresponding second attributes may be stored in the first communications network 104 so that the original attributes (the first attributes) may be restored (e.g. de-pseudonymised) at a later point.

The gateway 102 sends the second trace data 142 (e.g. the pseudonymised trace data) to the monitoring node 108. The monitoring node 108 may be an as-a-Service monitoring tool, for example. The monitoring node 108 may be configured to perform network monitoring or network performance analysis. For example, the monitoring node 108 may be configured to analyse data flows in a communications network in order to identify performance issues (e.g. bottlenecks).

In the illustrated example, the monitoring node 108 is shown as external to the first communications network 104. That is, the monitoring node 105 is in a different communications network to the container 106, and the gateway 102 is a gateway between the first communications network 104 and a second network comprising the monitoring node 108. However, the skilled person will appreciate that the monitoring node 108 may alternatively form part of the first communications network 104.

The monitoring node 108 uses the second trace data 142 to determine first network monitoring information 144 for the first communications network 104 and sends the first network monitoring information 144 to the gateway 102. The first network monitoring information 144 comprises the one or more second attributes (e.g. the pseudonymised first attributes) as well as data indicative of network performance. For example, the network monitoring information may comprise one or more of the following: groupings or categorisations of particular network information (e.g. all requests made by a particular user, requests made in a particular cell, messages relating to handover from one cell to another and/or the nodes involved handling a request), performance metrics (e.g. a rate at which messages are sent or received at a particular node), service-level agreement monitoring parameters, aggregations or combinations of network information (e.g. a total time taken for a request to propagate through the network and/or a total time taken for a request to be fulfilled), outliers or unusual events identified in the network, network parameters that are outside of predefined ranges (e.g. above a threshold) and any other suitable network monitoring information.

The gateway 102 receives the first network monitoring information 144 from the monitoring node 108 and replaces some or all of the second attributes to provide second network monitoring information 146. The gateway 102 may replace some or all of the second attributes with the corresponding first attributes. Alternatively, the gateway 102 may replace some or all of the second attributes with third attributes that are based on the first attributes but are different to the first attributes. In the latter case, the gateway 102 may replace the third attributes may be less identifying than their corresponding first attributes, but more identifying that the second attributes. For example, the gateway 102 may replace a randomly generated number (the second attribute) corresponding to a cell identifier (the first attribute) with an identifier indicating that a device is within one of a group of cells (the third attribute). The gateway 102 may thus effectively de-pseudonymise some or all of the second attributes in the network monitoring information.

The de-pseudonymised data 146 may be sent to a user interface 110 in the first communications network 104 to be output to a user. The user interface node 110 may comprise, for example, a visual interface for displaying networking monitoring information to a user. Alternatively, the gateway 102 may store the second network monitoring information 146 in the first communications network 104. The second network monitoring information 146 may be retrieved on request from a user, for example.

In either case, the information that is output to the user may depend on an access level of the user. Thus, for example, users associated with a higher access level may be provided with more sensitive or private information, whereas users with a lower access level may be provided with pseudonymised or partially redacted information. In some aspects, the user interface node 110 may determine an access level for a user by querying an authentication or authorization node 112. The authentication node 112 may be in the first communications network 104 or it may be external to the first communications network 104. The user interface node 110 may thus send a request to the authorization node 112 for an access level of a particular user, for example. The user interface node 110 may determine which attributes in the second network monitoring information 146 to provide to the user (e.g. to display to the user) based on the access level of the user.

In particular aspects, the gateway 102 may determine the second network monitoring information based on an access level of the user. In particular, the gateway 102 may determine which of the second attributes to replace when generating the second network monitoring information and/or what they should be replaced with based on an access level of the user. The gateway 102 may receive an indication of the access level of the user from, for example, the user interface node 110 or directly from the authorization node 112 (e.g. by sending a request to the authorization node 112).

Aspects of the disclosure thus provide a method by which network monitoring tools can be efficiently and effectively used to monitor network performance whilst minimising the extent to which private or sensitive information is shared.

Figure 2:
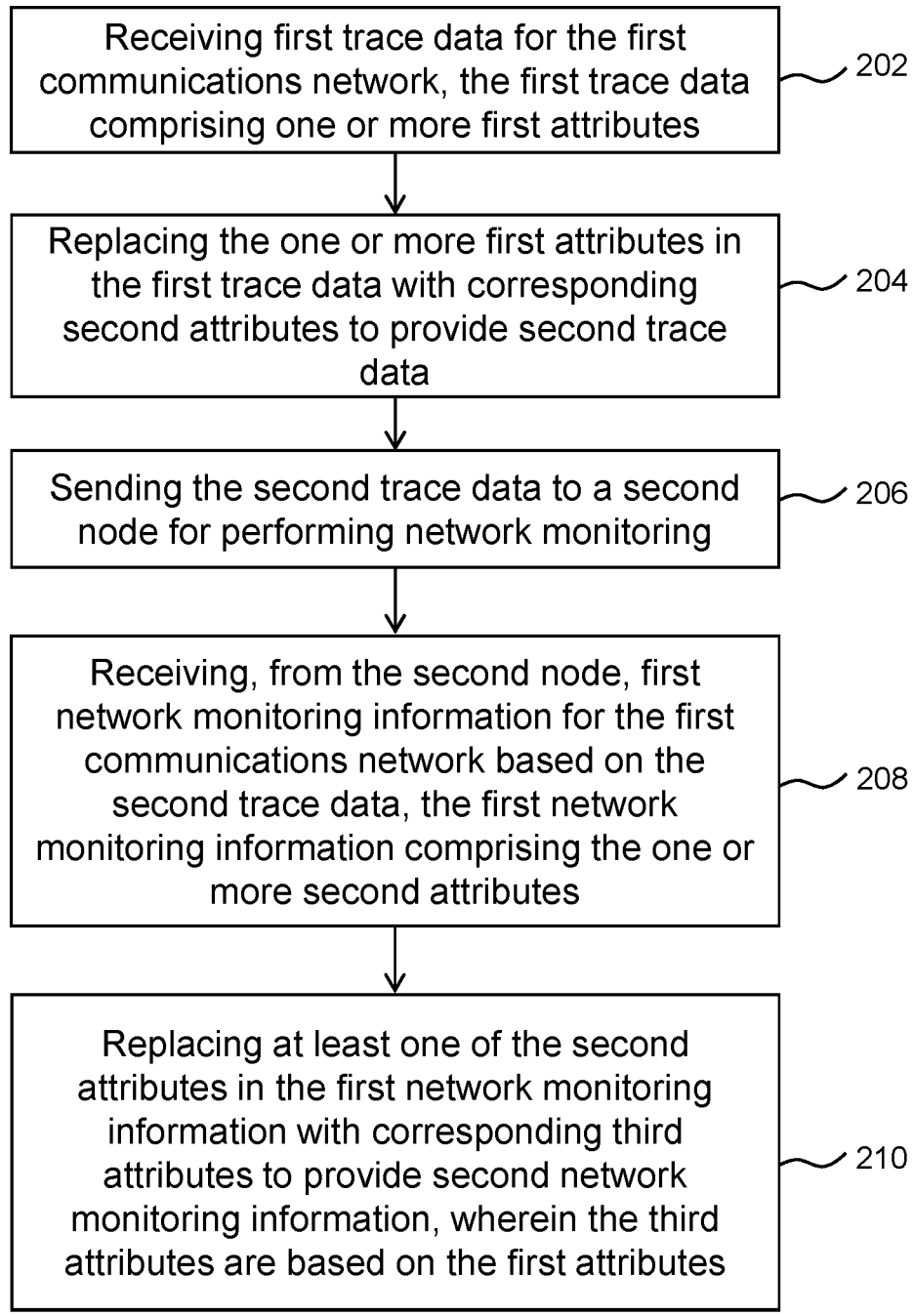
FIG. 2 is a flowchart of an example of a method performed by a first node.

FIG. 2 is a flowchart of an example of a method 200 performed by a first node in a first communications network.

The first communications network may be the first communications network 104 described above in respect of FIG. 1, for example. The first communications network 104 may thus be, for example, a core network in cellular communications network.

The first node may be, for example, the gateway 102 described above in respect of FIG. 1. In another example, the first node 102 may be any suitable network function in the first communications network 104. Thus, for example, the first node 102 may be a network function in a core network of a cellular network.

The method begins in step 202, in which the first node 102 receives first trace data for the first communications network 104. The first trace data 140 may be the first trace data described above in respect of FIG. 1, for example.

The first trace data 140 may be data which is indicative of activity in the first communications network 104. The first trace data 140 comprises at least one attribute. The at least one attribute may be from one or more messages sent or received by nodes in the first communications network 104. The at least one attribute may comprise contents of messages sent in the first communications network 104 and/or metadata relating to messages sent in the first communications network 104. For example, the at least one attribute may comprise a name of a message sent in the first communications network 104, a time at which a message is sent, a sender or recipient of a message or any other information relating to messages sent in the first communications network 104.

The attributes may relate to messages sent or received over a HyperText Transfer Protocol (HTTP) communications protocol. The format of the messages may be defined by a 3GPP standard. For example, in the context of core networks in communications networks, the interfaces between nodes in the core network are defined by various 3GPP standards. These standards specify the types of messages which may be transferred over interfaces in the core network, including the data (e.g. attributes) which may be included in each message. Thus, the at least one attribute in the first trace data 140 may be a field (e.g. an attribute) that is specified in a 3GPP standard.

The first trace data 140 may be received from another node in the first communications network 104. For example, the first trace data 140 may be received from a container in the first communications network 104, such as the container 106 described above in respect of FIG. 1. The first trace data 140 may be received from a network function in the first communications network 104. For example, the first communications network 104 may be a core network of a communications network (e.g. a cellular network) and the first trace data 140 may be received from a network function in the core network.

In particular examples, the first trace data 140 may be received from one or more nodes in the first communications network 104. For example, the first node 102 may receive trace data from a plurality of nodes (e.g. containers or network functions) in the first communications network 104. The first node 102 may thus aggregate trace data from a plurality of nodes in the first communications network 104 to obtain the first trace data 140.

In step 204, the first node 102 replaces one or more first attributes in the first trace data 140 with second attributes to provide second trace data for sending to a second node. The second trace data may be the second trace data 142 described above with respect to FIG. 1, for example. By replacing the one or more first attributes in this manner, the first node may obscure or limit any private (e.g. sensitive) information in the trace data to prevent it from being shared with the second node. Thus, for example, if the second node is in another communications network, then the first node 102 may prevent private information from being shared outside of the first communications network 104.

The first node 102 may replace some or all of the attributes in the first trace data 140. The one or more first attributes may thus comprise a subset of the attributes in the first trace data 140. The first node 102 may determine which attributes in the first trace data 140 to replace based on one or more factors. In some examples, each of the attributes in the first trace data 140 may be associated with a respective privacy level. A privacy level associated with an attribute may indicate an extent to which sharing of the attribute is restricted. For example, a privacy level may indicate whether sharing of the attribute by the first node 102 outside of the first communications network 104 is prohibited.

The first trace data 140 may comprise one or more privacy indicators corresponding to the attributes in the first trace data 140. Each of the privacy indicators may indicate a privacy level associated with its respective attribute.

Alternatively, the first node 102 may determine one or more privacy levels associated with the first trace data 140 (e.g. a respective privacy level for each attribute in the first trace data 140) based on one or more of the following factors.

The first node 102 may determine a respective privacy level for an attribute based on an interface associated with the respective attribute. That is, the first trace data 140 may determine the privacy level for an attribute according to the interface over which the attribute was sent. For example, interfaces between network functions in a core network of a cellular communications network may be defined by a 3GPP standard. The standard may specify the information shared over respective interfaces, and some interfaces may be more likely to be used for sending private or sensitive information. The interface over which an attribute is sent may thus provide an indication of the privacy of the attribute. Similarly, the first node may determine the privacy level of an attribute based on a sender or recipient of the attribute (e.g. a network function that received or sent the attribute).

The privacy level may be determined based on a type of message associated with the attribute. According to, for example, 3GPP standards, particular types of messages may be more likely to contain private or sensitive information, which means that the type of message in which an attribute is sent may be indicative of a privacy level of the attribute. The first node 102 may thus determine the respective privacy levels of attributes in the first trace data 140 based on messages in which the attributes were sent.

The first node 102 may determine the privacy level of an attribute based on the name of the attribute (e.g. based on the name of an attribute of a HTTP message defined in a 3GPP standard). Particular attributes may contain more sensitive information. For example, a Subscription Permanent Identifier (SUPI) attribute may be used to identify and/or track a user. A SUPI attribute may thus be associated with a higher privacy level than, for example, a SupportedFeatures attribute, which may indicate the features for a service that are supported by a HTTP client.

In particular aspects, the first node 102 may determine one or more privacy levels associated with the first trace data 140 based on the content of an attribute in the first trace data 140. The first node 102 may thus determine the privacy level of a particular attribute based on its contents. The skilled person will appreciate that the contents of an attribute may indicate its sensitivity or importance. For example, a name of an attribute may specify that the attribute indicates a user's location. However, the precision to which a user's location is specified in the attribute (e.g. whether to the closest metre, town or country) may only be apparent by considering the contents of the attribute.

In particular examples, the content of one or more attributes in the first trace data 140 may be used to determine privacy levels of some or all of the attributes in the first trace data 140 (e.g. including attributes other than the attributes which are used to determine the privacy levels). For example, the first trace data 140 may comprise an attribute containing a name or unique identifier of a user (e.g. a SUPI number) for which sharing of information related to the user is prohibited or restricted. The first node 102 may infer that the other attributes in the first trace data 140 are likely to be associated with the user and may thus determine that the attributes in the first trace data 140 are associated with a relatively high privacy level.

The skilled person will appreciate that the privacy level of an attribute may be determined based on any combination of the factors described above. The first node 102 may be, for example, configured with a process or method for determining the privacy level of an attribute using one or more of these factors. The relationship between these factors and the privacy level assigned to an attribute may initially be determined in a manual process in which an operator classifies the confidentiality or privacy of various attributes (e.g. attributes defined in a 3GPP standard). The first node 102 may then be configured with a process for automatically classifying attributes based on the classifications determined by the operator.

Table 1 shows a number of exemplary attributes and associated privacy levels or classifications according to aspects of the disclosure.

In the examples shown in Table 1, each of the attributes are assigned one of three privacy levels: Green, Orange, Red, which are associated with increasing sharing restrictions. Thus, for example, the first node 102 may be prohibited from sending attributes associated with a Red or Orange privacy level to the second node. However, the first node 102 may be permitted to send attributes with a Green privacy level to the second node. According to aspects of the disclosure, the first node may determine to replace (e.g. pseudonymise) any attributes associated with a Red or Orange privacy level in the second trace data 142, whereas attributes associated with a Green privacy level may be included in the second trace data 142 unaltered.

TABLE 1

| Interface | Origin | Destination | Message | Data element | Privacy classification |
| --- | --- | --- | --- | --- | --- |
| Nausf | AMF | AUSF | Nausf_UEAuthenticate_authenticate Request | SUCI | Orange |
| Nausf | AUSF | AMF | Nausf_UEAuthenticate_authenticate Response | Authentication result | Red |
| Nausf | AUSF | AMF | Nausf_UEAuthenticate_authenticate Response | SUPI | Orange |
| Nudm | AMF | UDM | Nudm_UEContextManagement_Registration Request | AMF Instance | Orange |
| Nudm | AMF | UDM | Nudm_UEContextManagement_Registration Request | Supported Features | Green |
| Nudm | AMF | UDM | Nudm_UEContextManagement_Registration Response | No Contents | Green |

The first node 102 may thus, in step 204, determine one or more first attributes in the first trace data 140 to replace, and replace the first attributes to provide second trace data 142.

The first node 102 may determine to omit attributes from the second trace data 142. The first node 102 may determine which attributes to omit based on a privacy level of the attributes. Thus, for example, attributes associated with a high (e.g. maximum) privacy level may not be included in the second trace data 142. For the exemplary attributes shown in Table 1, the first node 102 may omit attributes associated with a Red privacy level from the second trace data 142, whilst replacing attributes associated with the Orange privacy level and keeping attributes associated the Green privacy level. The first node 102 may thus apply a tiered approach in which the pseudonymisation that is applied to the first trace data 140 varies depending on the privacy classifications or levels associated with the first trace data 140.

The skilled person will appreciate that there may be other reasons for omitting attributes from the second data. For example, the first data may omit data that is considered irrelevant to network monitoring from the second trace data 142, thereby reducing the volume of data sent to the second network node. The first node 102 may determine which attributes to omit from the second trace data 142 (e.g. which data to discard) based on an indicator in the first trace data 140. For example, each of the attributes in the first trace data 140 may be associated with a flag or Boolean indicating whether or not the respective attribute should be discarded. Alternatively, the first node 102 may determine which attributes to omit based on one or more of the factors described above for determining privacy levels. Thus, for example, the first node 102 may determine that attributes with particular names are of lesser or no relevance to network monitoring and may not include them in the second trace data 142. In a particular example, an attribute associated with a privacy classification of "Grey" may indicate that the attribute should be omitted.

In step 206, the first node 102 sends the second trace data 142 to a second node for performing network monitoring. The second node may be a network monitoring node such as the monitoring node 108 described above in respect of FIG. 1. The second node 108 may thus be for performing network analysis by, for example, analysing data flows in the first communications network 104. In particular examples, the second node 108 may be for providing Monitoring as-a-Service (MaaS).

The second node 108 may be in a second communications network (e.g. a network that is different to the first communications network 104). Thus, for example, the second node 108 may be external to the first communications network 104. In which case, the first node 102 may provide an interface between the first communications network 104 and the second communications network (e.g. the first node 102 may act as a gateway between the networks). The first and second communications network may be operated by different providers. Aspects of the disclosure may thus facilitate network monitoring whilst limiting the extent to which sensitive information is shared with networks operated by other network or service providers.

In particular aspects, the first communications network 104 may be a private network and the second communications network may be a public network. The first communications network 104 may be accessible to a limited or restricted number of users such that the first communications network 104 is accessible by fewer users than the second communications network. By restricting the data shared with the second communications network, the risk of sensitive or personal information being obtained by unauthorized users may be reduced.

In an alternative example, the second node 108 may be in the same communications network as the first node 102 (e.g. in the first communications network 104). However, the second node 108 may be operated or controlled by a different vendor than the first node 102. Aspects of the disclosure may thus allow for using network monitoring tools provided by different vendors, whilst minimising the extent to which private or sensitive data is shared between vendors.

The second trace data 142 may be sent directly or indirectly from the first node 102 to the second node 108. Thus, for example, the first node 102 may send the second trace data 142 to the second node 108 via one or more intermediate nodes. In particular examples, the one or more intermediate nodes may be in a different communications network to both the first node 102 and the second node 108. For example, each of the first node 102 and the second node 108 may be in respective private communications networks, and the first node 102 may transmit the second trace data 142 to the second node 108 via one or more intermediate nodes in a public network.

The second node 108 uses the second trace data 142 to perform network monitoring or analysis for the first communications network 104 to obtain first network monitoring information. The first network monitoring information may be the first network monitoring information 144 described above with respect to FIG. 1, for example. The first network monitoring information 144 may be determined using only the second trace data 142 or, for example, the second node 108 may use the second trace data 142 in combination with other trace data for the first communications network 104 (e.g. historical trace data). The skilled person will appreciate that there are various methods and tools for performing network monitoring (e.g. performance analysis) for communications networks and these will not be described herein.

In step 208, the first node 102 receives, from the second node 108, the first network monitoring information 144 for the first communications network 104 based on the second trace data 142. The first network monitoring information 144 comprises the one or more second attributes. The first node 102 may receive the first network monitoring information 144 directly or indirectly (e.g. via one or more intermediate nodes) from the second node 108.

The first node 102 replaces at least one of the second attributes with corresponding third attributes to provide second network monitoring information. The second network monitoring information may be the second network monitoring information 146 described above with respect to FIG. 1, for example. The third attributes are based on the first attributes. Thus, the third attributes may be the first attributes, such that the first node 102 replaces the at least one of the second attributes with the corresponding first attributes that were pseudonymised in step 204. Alternatively, the third attributes may be different from, but based on the first attributes. The third attributes may indicate the same or similar information as the third attributes to a lesser degree of precision (e.g. the third attributes may be less granular than the first attributes). For example, the third attributes may indicate that a group of users are in a same cell, whereas the first attributes may additionally indicate the cell identifier that is common to the group of users.

The first node 102 may use a database or look-up table in order to determine the third attributes. For example, a database or look-up table may be used to store the first and second attributes, and the first node may determine which first attributes correspond to the at least one second attributes based on the database or look-up table.

As stated above, at least one of the second attributes are replaced by corresponding third attributes. The first node 102 thus replaces some or all of the second attributes to provide the second network monitoring information 146. Accordingly, some of the attributes included in the second network monitoring information 146 may remain pseudonymised, whilst others may be replaced by the third attributes (e.g. by the original first attributes or by less identifying third attributes as described above).

The first node may determine which of the second attributes to replace based on what information is required for the network monitoring information to be used effectively. For example, in step 204, in which first attributes are replaced with second attributes to provide second trace data 142, subscriber telephone numbers may be replaced with randomly generated identifiers for the users. In step 208, the first node may use these randomly generated identifiers in the second network monitoring information 146, rather than replacing them with the subscribers' telephone numbers. This may allow data flows corresponding to a specific subscriber to be identified in the network monitoring information, without identifying the particular subscriber.

In particular aspects, the second network monitoring information 146 may be for a user and the first node 102 may determine which of the second attributes to replace based on an access level of a user. The output of the second network monitoring information 146 to a user, and the manner in which a user access level may be used to determine which attributes to replace is described in more detail below.

In order to output the second network monitoring information 146 to a user, the first node 102 may comprise a user interface. Alternatively, the first node 102 may send the second network monitoring information 146 to a third node in the first communications network 104 for outputting to a user. The third node may be any suitable user interface such as, for example, the user interface 110 described above in respect of FIG. 1. In further alternative aspects, the third node may be in a different communications network (e.g. not in the same network as the first and/or second nodes). Thus, for example, the first node 102 may send the second network monitoring information to a node that is external to the first communications network 104.

The second network monitoring information 146 may thus be for outputting to a user, either by the first node or another node (e.g. in the first communications network 104). The second network monitoring information 146 may be for outputting to a particular user with an associated access level. In which case, the first node 102 may determine which of the second attributes to replace based on an access level of the user and/or how to replace the second attributes based on an access level of the user.

Accordingly, the network monitoring information provided to a user with a higher access level may contain more sensitive or private information than the network monitoring information provided to a user with a lower access level. For example, each of the second attributes may be de-pseudonymised (e.g. replaced with the corresponding first attributes) for a user with a higher access level, whereas only some of the second attributes may be de-pseudonymised for a user with a lower access level.

In particular examples, the first node determines the at least one of the second attributes to replace based on both the access level of the user and a privacy level associated with the attributes (e.g. associated with the original first attributes). Thus, for the exemplary attributes shown in Table 1, attributes associated with an Orange or Red privacy classification may still be pseudonymised in the second network monitoring information 146 provided to a user with a relatively low access level. However, if the second network monitoring information 146 is for a user with a relatively high access level, then attributes associated with an Orange or Red privacy classification may also be de-pseudonymised (e.g. replaced with the original first attributes or with less identifying information based on the first attributes). In this way, users with a lower access level may still access network monitoring information without compromising the confidentiality requirements. In addition, users with a higher access level are provided with more detailed information, thereby enabling the network monitoring information to be used more effectively.

As described above, the third attributes with which the second attributes are replaced may be determined based on a privacy level of the attributes. In particular aspects, the third attributes may be further determined based on an access level of the user. For example, the first node 102 may replace the second attributes with the original first attributes when providing second network monitoring information 146 for a user with a high access level. However, the first node 102 may replace the second attributes with less precise or less granular information based on the first attributes for a user with a lower access level. Thus, the extent to which attributes are de-pseudonymised may also be determined based on the access level of a user and a privacy level of the attributes.

For example, for network monitoring data that includes data collected from mobile phones, a user with highest access level be provided with the cell identifier (an indicator of location) of each mobile phone in the second network monitoring information 146. However, a user with a medium access level may only be provided with information indicating that a particular group of mobile phones were in the same cell (similar information with a lesser degree of granularity), and a user with low access rights may only be provided with pseudonymised versions of the cell identifiers (e.g. randomly generated identifiers for the cells that do not indicate location).

Thus, the access level of a user may be used to determine which of the at least one of the second attributes to replace and/or the third attributes to replace the second attributes with.

The access level of a user may be indicated to the first node 102 in a request for network monitoring information. The request may be received directly from the user or from the third node 110 in the first communications network 104 (the node for outputting the network monitoring information to the user). The first node 102 may provide the second network monitoring information 146 to the user in response to receiving the request. For example, the first node 102 may receive a request from the third node 110 for network monitoring information, in which the request indicates an access level of the user. In response to the request, the first node 102 may determine the second network monitoring information 146 based on the first network monitoring information 144 and the user access level (e.g. the first node 102 may determine which attributes to replace and replaces them). The first node 102 may send the second network monitoring information 146 to the third node 110 for outputting to the user. The third node 110 may then output (e.g. display) the second network monitoring information 146 to the user.

The first node 102 may determine an access level of a user based on an indication received from an authentication node. The first node 102 may receive the indication in response to sending a request to the authentication node. For example, the first node 102 may send a request to the authentication node to indicate (e.g. confirm or identify) an access level of the user. The first node 102 may receive, from the authentication node, a response comprising the access level of the user. Alternatively, the first node 102 may identify a user and specify a required or desired access level in the request, and the response from the authentication node may only indicate whether or not the user meets the required access level (e.g. using a flag or Boolean). The response from the authentication node may thus confirm whether or not the user has a required access level without revealing the specific access level of the user.

The authentication node may be in the first communications network 104. In examples in which the first communications network 104 is a core network, the authentication node may be a core network function.

Aspects of the disclosure thus allow for effectively monitoring communications networks, whilst still maintaining the privacy of network information. This may be particularly relevant for networks employing containers and microservices, for which network analysis and monitoring tools are increasingly only available as-a-Service, which means that network information may need to be shared over a public network in order to make use of these tools. Particular aspects of the disclosure also enable limiting the private information which is shared with a network operator (e.g. someone making use of the information obtained from network monitoring tools), thereby further maintaining the confidentiality of network data in communications networks.

Figure 3:
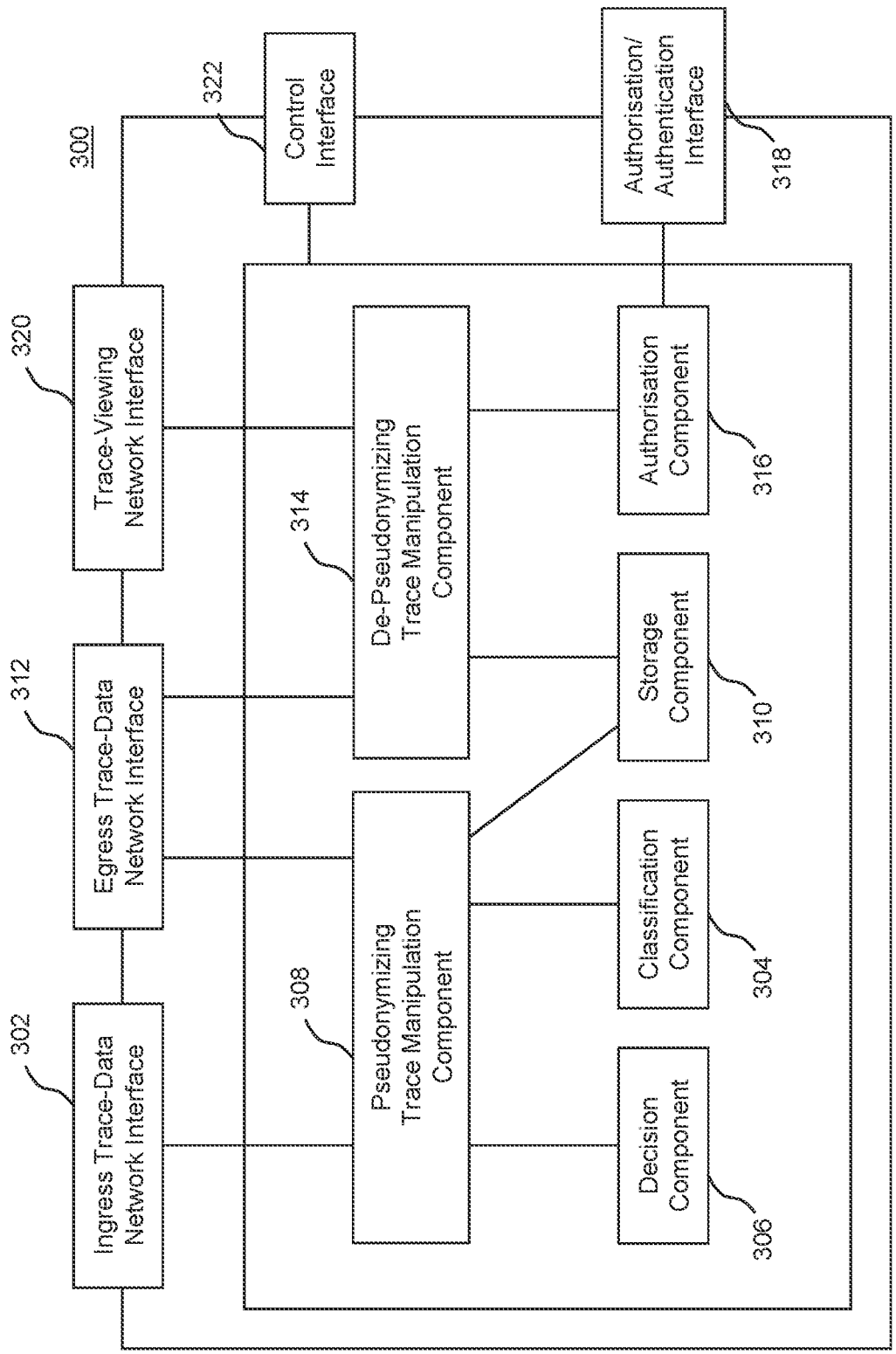
FIG. 3 shows a schematic diagram of a first node 300 in a first communications network.

FIG. 3 shows a schematic diagram of a first node 300 in a first communications network according to aspects of the disclosure. The first node 300 may be, for example, the gateway 102 described above in respect of FIG. 1. The first communications network may be the first communications network 104 described above in respect of FIG. 1, for example.

The first node 300 may be configured to perform the method 200 described in respect of FIG. 2. The components and interfaces of the first node 300 that may be used to perform the method 200 are described in more detail as follows.

The first node 300 comprises a first interface 302 for receiving first trace data for the first communications network, in which the first trace data comprises one or more first attributes. Thus, for example, the first interface 302 may be between the first node 300 and one or more network functions in the first communications network. The first trace data may be, for example, the first trace data 140 described above in respect of FIG. 1.

The first trace data is received at a pseudonymiser 308 in the first node 300. The pseudonymiser 308 is configured to replace the one or more first attributes in the first trace data with corresponding second attributes to provide second trace data. The pseudonymiser 308 may thus perform step 304 as described above in respect of FIG. 2, for example.

The first node 300 may comprise a classification component 304 for classifying attributes in the first trace data. The classification component 304 may be configured to determine one or more privacy levels for the first trace data. For example, the classification component 304 may determine respective privacy levels for one or more attributes in the first trace data.

The first node 300 may further comprise a decision component 306 for determining which of the attributes in the first trace data to replace and/or omit when generating the second trace data. The decision component 306 may be configured to determine which attributes to replace and/or omit based on the privacy levels determined by the classification component 304. The decision component 306 may further configured to determine the one or more second attributes that the first attributes are replaced with.

For example, the decision component 306 may be configured to use a look-up table or database to determine the one or more second attributes. The look-up table or database may be stored in a storage component 310 in the first node 300, for example.

Alternatively, the decision component 306 may be configured to use a predetermined process or algorithm for determining the one or more second attributes. In either case, the first node 300 may be configured to store an association (e.g. relationship) between the first attributes and the second attributes in the storage component 310. Although the storage component 310 is illustrated as forming part of the first node 300, the skilled person will appreciate that the storage component 310 may alternatively be external to the first node 300 (e.g. external to the first node 300 but still in the first communications network).

The pseudonymiser 308 is configured to send the second trace data to a second network node for performing network monitoring. The second network node may be the monitoring node 108 described above in respect of FIG. 1. The pseudonymiser 308 may be configured to perform step 206 as described above in respect of FIG. 2, for example. The second trace data may be sent over a second interface 212 between the first node 300 and the second node. The second node may be external to the first communications network, such the second interface 212 is an interface between two different communications networks.

The first node 300 is configured to receive, from the second node, first network monitoring information for the first communications network based on the second trace data. The first network monitoring information comprises the one or more second attributes. A de-pseudonymiser 314 in the first node 300 is configured to replace at least one of the second attributes in the first network monitoring information with corresponding third attributes to provide second network monitoring information. The third attributes are based on the first attributes. The de-pseudonymiser 314 may thus be configured to perform step 210 as described in respect of FIG. 2, for example.

In order to de-pseudonymise the network monitoring information, the de-pseudonymiser 314 may be configured to determine the third attributes based on information obtained from the storage component 310. As described above, an association between the first attributes and the second attributes may be stored in the storage component 310. The de-pseudonymiser 314 may thus be configured to query the storage 310 to determine the original (first) attributes to replace the second attributes when providing the second network monitoring information.

As described above in respect of FIGS. 1 and 2, the second network monitoring information may be for outputting to a user. The de-pseudonymiser 314 may determine which attributes to replace and what they should be replaced with based on an access level of the user. The first node 300 may comprise an authorization component 316 for determining the access level of the user. The authorization component 316 may, for example, request an indication of the access level of the user from an authorization node (e.g. in the first communications network). The authorization node may the authorization node 112 described above in respect of FIG. 1, for example. The first node 300 may thus comprise a third interface 318 for communicating with the authentication node.

Alternatively, the first node 300 may receive an indication of the access level of the user from a user interface for outputting information to a user. The first node 300 may thus comprise a fourth interface 320 for communicating with the user interface. The user interface may be the user interface 110 described above in respect of FIG. 1, for example.

The first node 300 may further comprise a fourth interface 322 (e.g. a control interface) over which messages for controlling the components and/or interfaces of the first node 300 may be sent and received. Thus, for example, the first node 300 may receive messages over the fourth interface 322 that instruct relevant components of the first node 300 to perform the steps of the method 200 described above in respect of FIG. 2. The fourth interface 322 may be between the first node 300 and an external control node, for example. Alternatively, the first node 300 may comprise an internal control component for controlling the components and/or interfaces of the first node 300.

Figure 4:
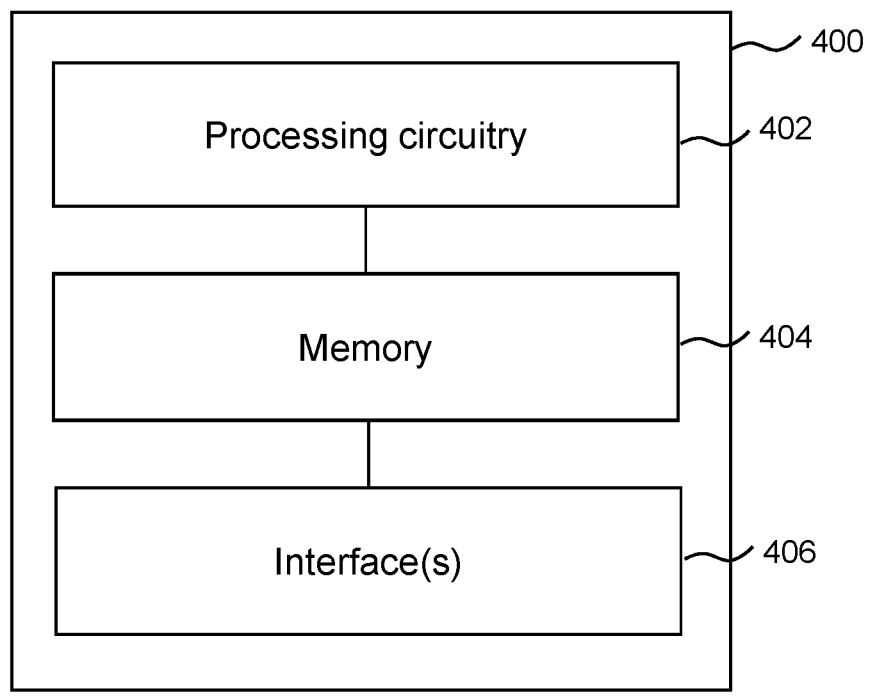
FIG. 4 is a schematic illustration of an example of a first node.

FIG. 4 shows a schematic diagram of a first node 400 in a first communications network according to embodiments of the disclosure. The first node 400 may be, for example, the gateway 102 described above in respect of FIG. 1 or the first node 300 described above in respect of FIG. 3. The first communications network may be the first communications network 104 described above in respect of FIG. 1, for example.

The first node 400 comprises processing circuitry (or logic) 402. The processing circuitry 402 controls the operation of the first node 400 and can implement the method 200 described above with respect to FIG. 2, for example. The processing circuitry 402 can comprise one or more processors, processing units, multi-core processors or modules that are configured or programmed to control the first node in the manner described herein. In particular implementations, the processing circuitry 402 can comprise a plurality of software and/or hardware modules that are each configured to perform, or are for performing, individual or multiple steps of the method described herein in relation to the first node 400.

Briefly, the processing circuitry 402 of the first node 400 is operable to: receive first trace data for the first communications network, the first trace data comprising one or more first attributes, replace the one or more first attributes in the first trace data with corresponding second attributes to provide second trace data, and send the second trace data to a second node for performing network monitoring. The processing circuitry 402 is further operable to: receive, from the second node, first network monitoring information for the first communications network based on the second trace data, in which the first network monitoring information comprises the one or more second attributes, and replace at least one of the second attributes in the first network monitoring information with corresponding third attributes to provide second network monitoring information, in which the third attributes are based on the first attributes.

Optionally, the first node 400 may comprise a computer-readable storage media (e.g. a memory) 404. In some examples, the memory 404 of the first node 400 can be configured to store instructions (e.g. program code) that can be executed by the processing circuitry 402 of the first node 400 to perform the method described herein in relation to the first node 400. In addition or alternatively, the memory 404 of the first node 400, can be configured to store any requests, resources, information, data, signals, or similar that are described herein. The memory 404 of the first node 400 may be configured to store one or more mappings between any of the first, second and third attributes, for example. The processing circuitry 402 of the first node 400 may be configured to control the memory 404 of the first node 400 to store any requests, resources, information, data, signals, or similar that are described herein.

In some examples, the first node 400 may optionally comprise a communications interface 406 (e.g. a network interface). The communications interface 406 of the first node 400 can be for use in communicating with other nodes, such as other virtual nodes (e.g. network functions or virtual network functions). For example, the communications interface 406 of the first node 400 can be configured to transmit to and/or receive from other nodes requests, resources, information, data, signals, or similar. The processing circuitry 402 of the first node 400 may be configured to control the communications interface 406 of the first node 400 to transmit to and/or receive from other nodes requests, resources, information, data, signals, or similar.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a first node in a first communications network, the method comprising:
   receiving first trace data for the first communications network, the first trace data being associated with information indicative of network activity, the first trace data comprising one or more first attributes, the one or more first attributes being associated to private and/or sensitive data;
   replacing the one or more first attributes in the first trace data with corresponding second attributes to provide second trace data, the second attributes being associated to one or both of less private and sensitive data than the first attributes;
   sending the second trace data to a second node, in the first communications network or in a second communications network, for performing network monitoring;
   receiving, from the second node, first network monitoring information for the first communications network based on the second trace data, the first network monitoring information comprising the one or more second attributes;
   replacing at least one of the second attributes in the first network monitoring information with corresponding third attributes to provide second network monitoring information, wherein the third attributes are based on the first attributes, but are different from the first attributes;
   determining the one or more first attributes in the first trace data to replace based on one or more privacy levels associated with the first trace data; and
   sending the second network monitoring information to a third node in the first communications network for outputting to a user.

2. The method of claim 1, further comprising determining the one or more privacy levels associated with the first trace data by based on one or more of the following:
   an interface associated with the respective attribute;
   a type of message associated with the respective attribute;
   a name of the respective attribute; and
   content of an attribute in the first trace data.

3. The method of claim 1, further comprising omitting one or more third attributes in the first trace data from the second trace data.

4. The method of claim 1, wherein the second network monitoring information is for providing to a user and the method further comprises:
   determining the at least one of the second attributes to replace in the first network monitoring information based on an access level of the user.

5. The method of claim 4, further comprising:
   receiving a request for network monitoring information for the first network, the request comprising an indication of the access level of the user; and
   providing the second network monitoring information in response to the request.

6. The method of claim 4, further comprising:
   receiving an indication of an access level of the user from an authentication node.

7. The method of claim 4, wherein determining the at least one of the second attributes to replace further comprises determining the at least one of the second attributes based on one or more privacy levels associated with the corresponding one or more first attributes.

8. The method of claim 1, wherein the third attributes are the first attributes corresponding to the at least one of the second attributes.

9. The method of claim 1, further comprising:
   outputting the second network monitoring information to a user.

10. The method of claim 1, wherein the first trace data is received from a fourth node in the first communications network.

11. The method of claim 1, wherein the first communications network is a core network in a cellular communications network.

12. The method of claim 1, wherein the second node is in a second communications network.

13. The method of claim 2, further comprising omitting one or more third attributes in the first trace data from the second trace data.

14. The method of claim 2, wherein the second network monitoring information is for providing to a user and the method further comprises:
   determining the at least one of the second attributes to replace in the first network monitoring information based on an access level of the user.

15. The method of claim 14, further comprising:
   receiving a request for network monitoring information for the first network, the request comprising an indication of the access level of the user; and
   providing the second network monitoring information in response to the request.

16. The method of claim 14, further comprising:
   receiving an indication of an access level of the user from an authentication node.

17. The method of claim 14, wherein determining the at least one of the second attributes to replace further comprises determining the at least one of the second attributes based on one or more privacy levels associated with the corresponding one or more first attributes.

18. The method of claim 14, wherein the third attributes are the first attributes corresponding to the at least one of the second attributes.

19. A computer storage medium storing a computer program comprising instructions which, when executed on at least one processor, cause the at least one processor to carry out a method, the method comprising:
- receiving first trace data for a first communications network, the first trace data being associated with information indicative of network activity, the first trace data comprising one or more first attributes, the one or more first attributes being associated to private and/or sensitive data;
- replacing the one or more first attributes in the first trace data with corresponding second attributes to provide second trace data, the second attributes being associated to one or both of less private and sensitive data than the first attributes;
- sending the second trace data to a second node, in the first communications network or in a second communications network, for performing network monitoring;
- receiving, from the second node, first network monitoring information for the first communications network based on the second trace data, the first network monitoring information comprising the one or more second attributes;
- replacing at least one of the second attributes in the first network monitoring information with corresponding third attributes to provide second network monitoring information, wherein the third attributes are based on the first attributes, but are different from the first attributes;
- determining the one or more first attributes in the first trace data to replace based on one or more privacy levels associated with the first trace data; and
- sending the second network monitoring information to a third node in the first communications network for outputting to a user.

20. A first node in a first communications network, the first trace data being associated with information indicative of network activity, the first node comprising a processor and a memory, the memory containing instructions executable by the processor such that the first node is configured to:
- receive first trace data for the first communications network, the first trace data comprising one or more first attributes, the one or more first attributes being associated to private and/or sensitive data;
- replace the one or more first attributes in the first trace data with corresponding second attributes to provide second trace data, the second attributes being associated to less private and/or sensitive data than the first attributes;
- send the second trace data to a second node, in the first communications network or in a second communications network, for performing network monitoring;
- receive, from the second node, first network monitoring information for the first communications network based on the second trace data, the first network monitoring information comprising the one or more second attributes;
- replace at least one of the second attributes in the first network monitoring information with corresponding third attributes to provide second network monitoring information, the third attributes being based on the first attributes but are different from the first attributes;
- determine the one or more first attributes in the first trace data to replace based on one or more privacy levels associated with the first trace data; and
- send the second network monitoring information to a third node in the first communications network for outputting to a user.

* * * * *